United States Patent
Yanagibayashi et al.

(10) Patent No.: US 12,123,533 B2
(45) Date of Patent: Oct. 22, 2024

(54) RESIN-TUBE END FORMATION METHOD AND FORMATION TOOL

(71) Applicant: SHIMADZU CORPORATION, Kyoto (JP)

(72) Inventors: Jun Yanagibayashi, Kyoto (JP); Kenichi Yasunaga, Kyoto (JP); Shinji Tanaka, Kyoto (JP); Shinya Imamura, Kyoto (JP); Ryo Hosono, Kyoto (JP); Hiromu Yamasaki, Kyoto (JP); Koshi Abe, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 874 days.

(21) Appl. No.: 17/092,381

(22) Filed: Nov. 9, 2020

(65) Prior Publication Data
US 2021/0156503 A1    May 27, 2021

(30) Foreign Application Priority Data
Nov. 21, 2019 (JP) .................. 2019-210691

(51) Int. Cl.
*F16L 47/14* (2006.01)
*B01L 3/00* (2006.01)
(Continued)

(52) U.S. Cl.
CPC .............. *F16L 47/02* (2013.01); *B01L 3/561* (2013.01); *B01L 3/563* (2013.01); *B29C 57/005* (2013.01);
(Continued)

(58) Field of Classification Search
CPC ...... B01L 3/561; B01L 3/563; B01L 2200/12; B01L 2200/141; B29C 57/005
See application file for complete search history.

(56) References Cited

U.S. PATENT DOCUMENTS

| 4,619,473 A | 10/1986 | Someya |
| 9,056,264 B2 | 7/2015 | Hahn |

(Continued)

FOREIGN PATENT DOCUMENTS

| JP | 62-115175 U | 7/1987 |
| JP | 04-089231 A | 3/1992 |

(Continued)

OTHER PUBLICATIONS

English translation of JPH 0742883A retrieved on Espacenet on Aug. 26, 2023 (Year: 2023).*

(Continued)

*Primary Examiner* — Emmanuel S Luk
*Assistant Examiner* — Elisa H Vera
(74) *Attorney, Agent, or Firm* — Renner, Otto, Boisselle & Sklar, LLP

(57) ABSTRACT

A resin tube is prepared. Further, a formation tool having a pressing surface and a projection that projects from the pressing surface and is insertable into the resin tube is prepared. The projection of the formation tool is inserted from an end of the resin tube into the resin tube. The pressing surface of the formation tool is pressed against an end surface of the resin tube. Thermal energy is applied to the end of the resin tube, whereby a shape of the pressing surface of the formation tool is transferred to the end surface of the resin tube, and the end of the resin tube is formed into a flange shape.

11 Claims, 7 Drawing Sheets

(51) Int. Cl.
  *B29C 57/00* (2006.01)
  *F16L 13/007* (2006.01)
  *F16L 13/02* (2006.01)
  *F16L 47/02* (2006.01)
  *G01N 30/60* (2006.01)

(52) U.S. Cl.
  CPC ............ *F16L 13/007* (2013.01); *F16L 13/02* (2013.01); *F16L 47/14* (2013.01); *G01N 30/6026* (2013.01); *B01L 2200/12* (2013.01); *B01L 2200/141* (2013.01)

(56) References Cited

U.S. PATENT DOCUMENTS

| | | |
|---|---|---|
| 9,091,693 B2 | 7/2015 | Hochgraeber |
| 9,134,283 B2 | 9/2015 | Hochgraeber |
| 9,494,563 B2 | 11/2016 | Falk-Jordan |
| 9,962,695 B2 | 5/2018 | Reinhardt |
| 10,018,604 B2 | 7/2018 | Burger |
| 2016/0116088 A1 | 4/2016 | Graham |
| 2016/0167288 A1* | 6/2016 | Rodgers ............... B29C 66/112 156/73.1 |
| 2021/0102649 A1* | 4/2021 | Imai ................ B29C 66/5221 |

FOREIGN PATENT DOCUMENTS

| | | |
|---|---|---|
| JP | 07-042883 A | 2/1995 |
| JP | 2012-101359 A | 5/2012 |
| JP | 2014-083820 A | 5/2014 |

OTHER PUBLICATIONS

Notice of Reasons for Refusal in corresponding Japanese Patent Application No. 2019-210691 dated Jan. 17, 2023, with English machine translation.

Notice of Reasons for Refusal in corresponding Japanese Patent Application No. 2019-210691 dated Aug. 1, 2023, with English machine translation.

\* cited by examiner

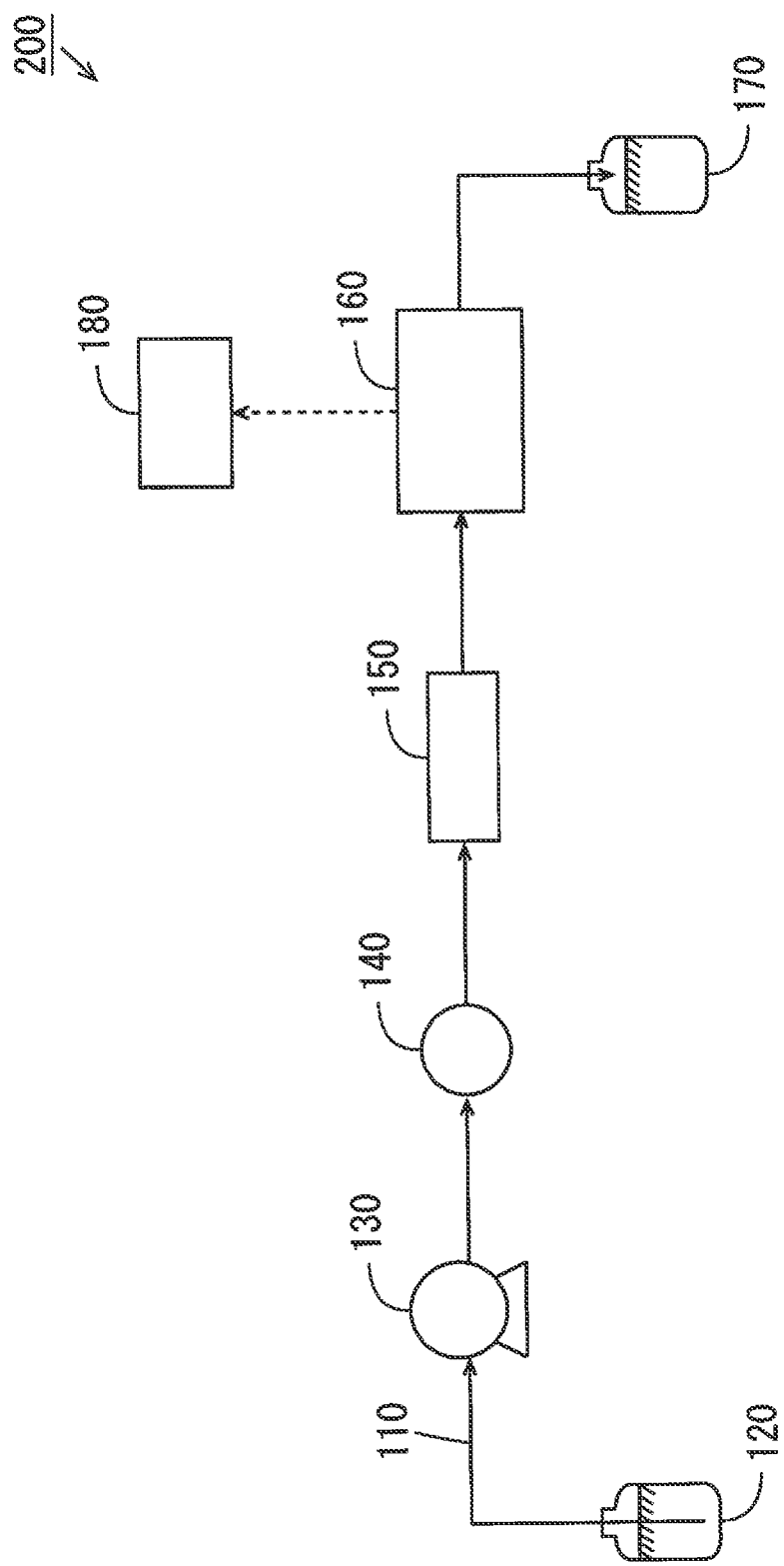
F I G. 1

RESIN-TUBE END FORMATION METHOD AND FORMATION TOOL

BACKGROUND

Technical Field

The present invention relates to a resin-tube end formation method and a formation tool.

Description of Related Art

A liquid chromatograph has been known as an analysis device that separates a substance included in a sample into different components. Here, in a case where a compound such as protein, peptide or pesticide is included in the sample, these compounds interact with metal and form a complex. Therefore, in a case where the portion that comes into contact with the sample such as a tubing in the liquid chromatograph is formed of metal, adsorption of the sample to the contact portion occurs due to interaction between metal and the sample and interferes with a proper analysis. As such, the portion that comes into contact with the sample of the tubing may be formed of resin. Further, a flange may be formed at an end of the tubing in order to improve sealability between the tubing and an object to which the tubing is coupled.

In U.S. Pat. No. 9,962,695 B2, a method of manufacturing such a tubing is described. Specifically, a sealing fluid member in which a stainless tubing-like metal sleeve is arranged around a capillary made of fused silica is prepared. A flow path is formed at the inner surface of the capillary, and a PAEK (Polyaryletherketon) material is applied to the outer surface of the capillary. The end of the sealing fluid member is inserted into a concave portion of a ceramic formation tool. Here, the bottom surface of the concave portion of the formation tool and the end surface of the sealing fluid member do not adhere to each other and are spaced apart from each other. Further, a placeholder is attached to a position in the flow path from the end of the sealing fluid member.

In this state, an eddy current is induced from an induction coil to a tubing-like metal sleeve, whereby the tubing-like metal sleeve is heated by induction. When the temperature of the PAEK material exceeds a melting point by heat conduction, the PEAK material melts. In this case, part of the PAEK material moves to the space between the bottom surface of the concave portion of the formation tool and the end surface of the sealing fluid member and makes a flange shape. The placeholder and the formation tool are detached after the PAEK material is solidified, whereby the sealing fluid member in which the flange is formed at the end is completed.

SUMMARY

An inner diameter of the tubing is likely to be small in order to improve separation performance of the liquid chromatograph. However, the smaller the inner diameter is, the more difficult it is to form a flange at the end of a resin tube without closing a flow path. Further, it may be difficult to form a flange at an end of a resin tube due to a high glass-transition temperature depending on the type of resin.

An object of the present invention is to provide a resin-tube end formation method and a formation tool that can facilitate formation of a flange at an end of a resin tube.

One aspect of the present invention relates to a resin-tube end formation method that includes preparing a resin tube, preparing a formation tool having a pressing surface and a projection that projects from the pressing surface and is insertable into the resin tube, inserting the projection of the formation tool from an end of the resin tube into the resin tube, pressing the pressing surface of the formation tool against an end surface of the resin tube and transferring a shape of the pressing surface of the formation tool to the end surface of the resin tube and forming the end of the resin tube into a flange shape by applying thermal energy to the end of the resin tube.

Another aspect of the present invention relates to a formation tool for forming an end of a resin tube that includes a metal tube having an end surface as a pressing surface for pressing an end surface of the resin tube and a metal member that is inserted into the metal tube and is made of a metal needle or a metal wire, wherein a projection that is insertable into the resin tube by projecting from the pressing surface of the metal tube is formed at a tip of the metal member.

The present invention can facilitate formation of a flange at an end of a resin tube.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 1 is a diagram showing the configuration of a chromatograph including a resin tube;

DETAILED DESCRIPTION (1) Configuration of Chromatograph

Figure 2:
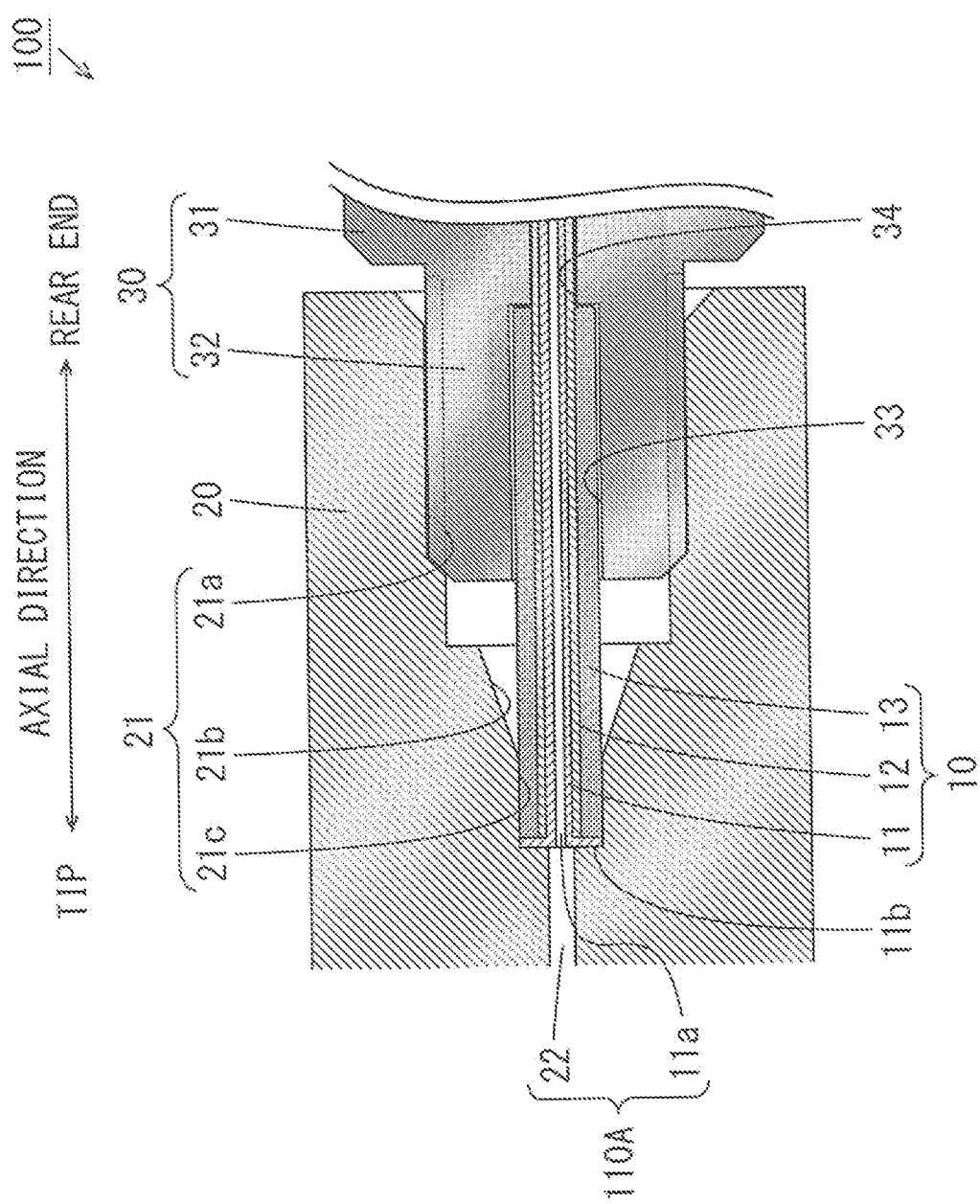
FIG. 2 is a cross sectional view showing one example of the configuration of a fitting provided in the chromatograph of FIG. 1.

A resin-tube end formation method and a formation tool according to embodiments of the present invention will be described below in detail with reference to the drawings. FIG. 1 is a diagram showing the configuration of a chromatograph including a resin tube. While being a liquid chromatograph, the chromatograph 200 in the present embodiment may be a supercritical fluid chromatograph.

As shown in FIG. 1, the chromatograph 200 includes a flow path 110, a mobile phase container 120, a pump 130, a sample supplier 140, a separation column 150, a detector 160, a liquid waste container 170 and a processing device 180. The flow path 110 is constituted by a plurality of joint tubings, and each tubing includes a resin tube. Details of the tubings will be described below. The mobile phase container 120 stores an aqueous solution or an organic solvent as a mobile phase.

The pump 130 pumps the mobile phase stored in the mobile phase container 120 through the flow path 110. The sample supplier 140 is a sample injector, for example, and supplies a sample to be analyzed to the mobile phase pumped by the pump 130. The sample supplied by the sample supplier 140 is mixed with the mobile phase and introduced into the separation column 150. The separation column 150 retains components of the sample for different periods of time depending on each component of the sample and an affinity between the separation column 150 and the mobile phase. The separation column 150 is stored in a column oven (not shown) and adjusted to a predetermined constant temperature.

After an elapse of a retention time during which the sample is retained by the separation column 150, the detector 160 sequentially detects the components of the sample eluted from the separation column 150. The liquid waste container 170 stores the mobile phase and the sample that have passed through the detector 160 as liquid wastes. The processing device 180 generates a liquid chromatogram representing the relationship between the retention time of each component and detection intensity by processing a result of detection by the detector 160.

(2) Configuration of Fitting

FIG. 2 is a cross sectional view showing one example of the configuration of a fitting provided in the chromatograph 200 of FIG. 1. A fitting is a system in which a tubing and an object to which the tubing is coupled are coupled such that fluid can pass through the tubing. As shown in FIG. 2, the fitting 100 extends in one direction (hereinafter referred to as an axial direction) and includes a tubing 10, a bushing 20 and a male nut 30. One end of the fitting 100 in the axial direction is referred to as a tip, and the other end of the fitting 100 in the axial direction is referred to as a rear end.

The tubing 10 includes a resin tube 11, a metal tube 12 and a sleeve 13. The resin tube 11 is formed of a fluororesin or PEEK (Polyether ether ketone), for example, and has a cavity 11a that penetrates in the axial direction. Further, the resin tube 11 has a flange 11b that spreads in a circumferential direction from a tip surface and is inserted into the metal tube 12 except for the flange 11b.

The metal tube 12 is formed of stainless, for example. The resin tube 11 is reinforced mechanically by being inserted into the metal tube 12. Further, the pressure resistance of the resin tube 11 is improved. The sleeve 13 is formed of metal or the like having a cylindrical shape and provided to surround the tip of the metal tube 12. The sleeve 13 may be joined to the metal tube 12 by welding, glueing or the like, or may be constituted integrally with the metal tube 12.

An opening 21 and a through hole 22 are formed in the bushing 20. The opening 21 includes a large diameter portion 21a, a tapered portion 21b and a small diameter portion 21c. The large diameter portion 21a extends from the rear end surface of the bushing 20 to the tip and has a relatively large diameter. A screw portion (female screw portion) is formed on the inner peripheral surface of the large diameter portion 21a of the bushing 20. The tapered portion 21b extends from the large diameter portion 21a toward the tip. The diameter of the tapered portion 21b decreases gradually from the rear end to the tip. The small diameter portion 21c extends from the tapered portion 21b toward the tip and has a relatively small diameter. The through hole 22 penetrates the bushing 20 from the bottom surface of the small diameter portion 21c to the tip.

The male nut 30 includes a head portion 31 and a shaft portion 32. The head portion 31 is the portion to which force is applied when the male nut 30 is fastened and has an outer shape (a polygon, for example) corresponding to a fastening tool such as a spanner. The shaft portion 32 is provided to project from the head portion 31 toward the tip. A screw portion (male screw portion) corresponding to the screw portion of the bushing 20 is formed on the outer peripheral surface of the shaft portion 32. Further, an opening 33 and a through hole 34 are formed in the male nut 30. The opening 33 extends from the tip surface of the male nut 30 toward the rear end. The through hole 34 penetrates the male nut 30 from the bottom surface of the opening 33 toward the rear end.

The tubing 10 is attached to the male nut 30 such that the resin tube 11 and the metal tube 12 are inserted into the through hole 34 and the rear end of the sleeve 13 is stored in the opening 33. The tip of the tubing 10 projects from the male nut 30 to the tip. In this state, the shaft portion 32 of the male nut 30 is fitted into the opening 21 of the bushing 20, and the head portion 31 is fastened by the fastening tool such that the male nut 30 rotates. Thus, the screw portion of the male nut 30 and the screw portion of the bushing 20 are threadedly engaged with each other, and the fitting 100 is completed.

In the fitting 100, a flow path 110A is constituted by the cavity 11a of the tubing 10 and the through hole 22 of the bushing 20 communicating with each other. Here, the bottom surface of the opening 33 of the male nut 30 presses the rear end surface of the sleeve 13 of the tubing 10, whereby the tip surface of the sleeve 13 presses the flange 11b against the bottom surface of the small diameter portion 21c of the opening 21 of the bushing 20. Thus, the gap between the through hole 22 and the opening 21 is sealed. As a result, the fluid that has flowed from the through hole 22 is prevented from leaking into the opening 21.

The flow path 110A of the above-mentioned fitting 100 may be provided as the entire flow path 110 of the chromatograph 200 of FIG. 1 or may be provided as part of the flow path 110. For example, the flow path 110A may be provided as the flow path 110 in the sample supplier 140 that supplies a sample at a high pressure or may be provided as part of the flow path 110 between the sample supplier 140 and the separation column 150.

(3) Formation Tool

Figure 3:
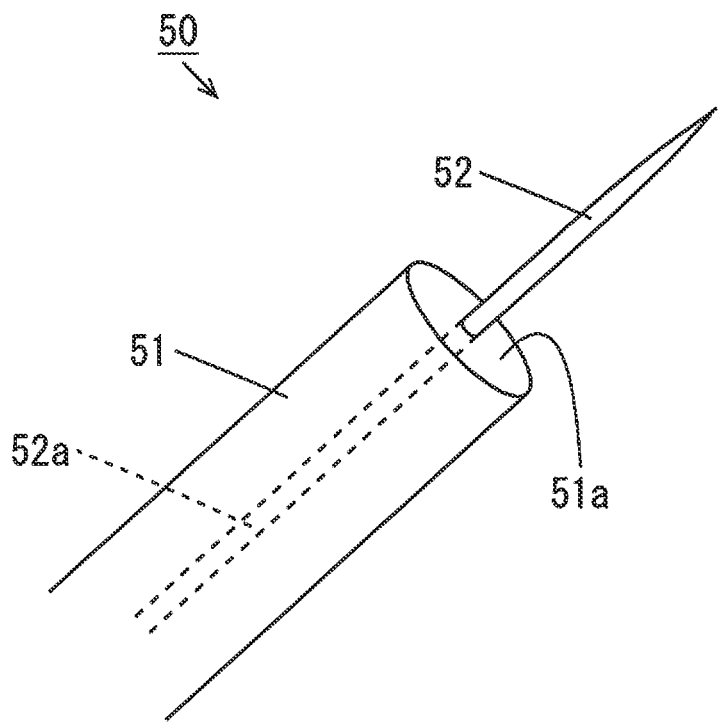
FIG. 3 is a perspective view showing one example of a formation tool.

The Flange 11b is formed by a process of the cylindrical resin tube using a predetermined formation tool. FIG. 3 is a perspective view showing one example of the formation tool. As shown in FIG. 3, the formation tool 50 includes a metal tube 51 and a projection 52. The metal tube 51 has a cylindrical shape extending in one direction. The projection 52 projects in one direction from the center of the tip surface of the metal tube 51.

The formation tool 50 may be formed by insertion of a metal member 52a having an outer shape corresponding to the inner diameter of the metal tube 51 into the metal tube 51. The metal member 52a may be a metal needle or a metal wire. In this case, the portion of the metal member 52a projecting from the end surface of the metal tube 51 is the projection 52. The metal member 52a may be fixed to the metal tube 51 by crimping of the outer peripheral surface of the metal tube 51. Alternatively, the metal member 52a may be fixed to the metal tube 51 by being soldered or brazed to the metal tube 51.

Specifically, the formation tool 50 may be formed by the metal member 52a having an outer diameter of 0.1 mm being inserted into or fixed to the metal tube 51 having an inner diameter of 0.1 mm and an outer diameter of 1.6 mm. Alternatively, the formation tool 50 may be formed by the metal member 52a having an outer diameter of 0.3 mm being inserted into or fixed to the metal tube 51 having an inner diameter of 0.3 mm and an outer diameter of 1.6 mm.

The end surface of the metal tube 51 surrounding the projection 52 is a pressing surface 51a for transferring (transfer-printing) the shape of the flange 11b to the end surface of a resin tube. Further, in the present embodiment, the formation tool 50 is configured to vibrate in one direction at a high speed by application of ultrasonic waves. Usage of the formation tool 50 will be described below.

(4) Resin-Tube End Formation Method

FIGS. 4 to 9 are cross sectional views for explaining the steps of the resin-tube end formation method. In the example of FIGS. 4 to 9, because being formed integrally with the metal tube 12, the sleeve 13 of FIG. 2 is not shown.

Figure 4:
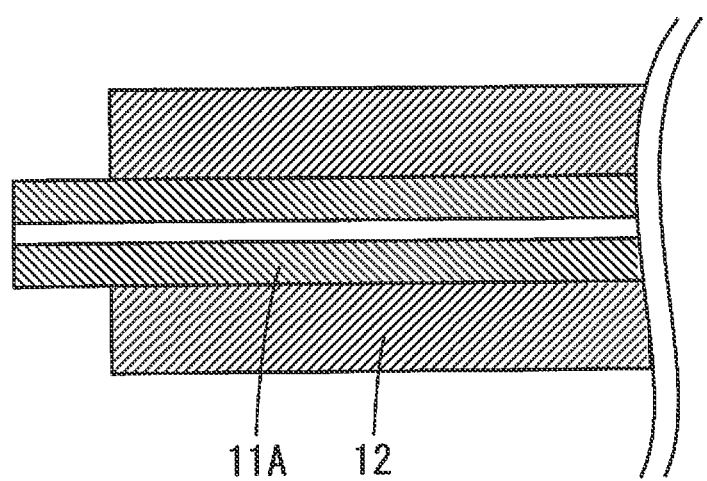
FIG. 4 is a cross sectional view for explaining the step of a resin-tube end formation method.

As shown in FIG. 4, a cylindrical resin tube 11A being inserted into the metal tube 12 is first prepared. The inner diameter of the resin tube 11A is not more than 0.3 mm, for example, and may be not more than 0.1 mm. The outer diameter of the resin tube 11A may be 0.36 mm, 0.8 mm or a value between 0.36 mm and 0.8 mm, for example. The tip surface of the resin tube 11A projects to a position farther than the tip surface of the metal tube 12. Although the projection length of the resin tube 11A is not more than 5 mm, for example, and may be not more than 1 mm, the projection length is desirably not less than the thickness of the resin tube 11A.

The inner diameter of the metal tube 12 corresponds to the outer diameter of the resin tube 11A. The clearance between the outer peripheral surface of the resin tube 11A and the inner peripheral surface of the metal tube 12 in a radial direction may be not less than 10 μm and not more than 20 μm, or may be less than 10 μm, for example. The outer diameter of the metal tube 12 may be 1.6 mm, 0.8 mm, a value between 1.6 mm and 0.8 mm or a value less than 0.8 mm, for example. In the present example, the inner diameter of the metal tube 12 is 0.4 mm, and the outer diameter of the metal tube 12 is 0.7 mm. The thickness of the metal tube 12 is desirably not less than 0.1 mm.

Figure 5:
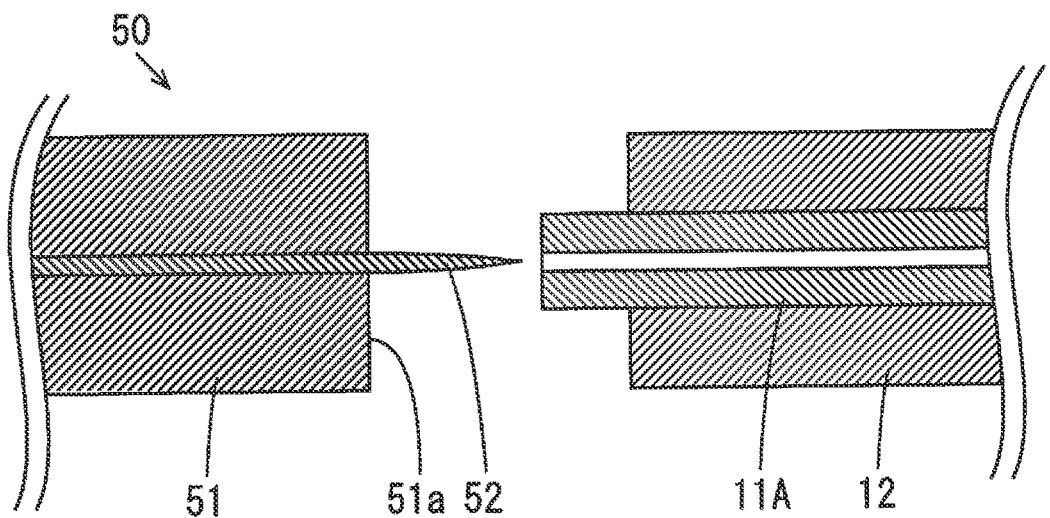
FIG. 5 is a cross sectional view for explaining the step of the resin-tube end formation method.
Figure 6:
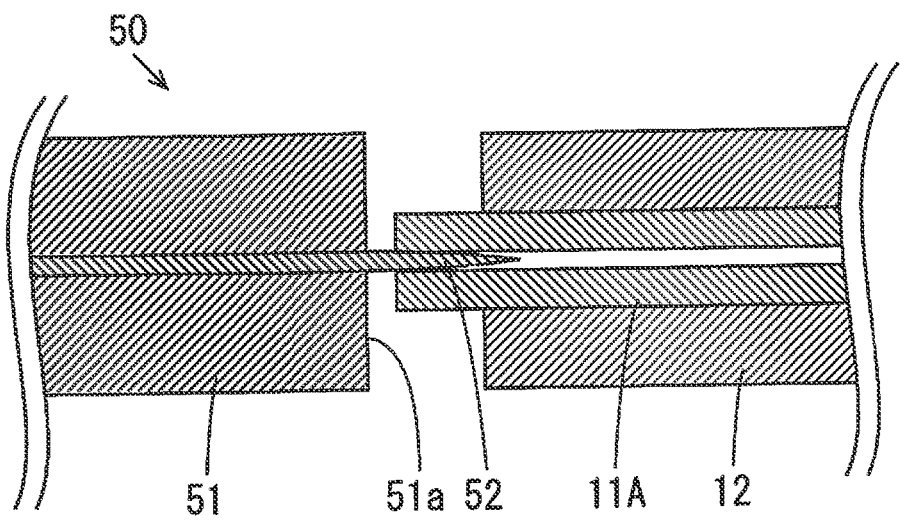
FIG. 6 is a cross sectional view for explaining the step of the resin-tube end formation method.

Next, as shown in FIG. 5, the formation tool 50 is prepared. The outer diameter of the projection 52 of the formation tool 50 corresponds to the inner diameter of the resin tube 11A, and is not more than 0.3 mm, for example, and may be not more than 0.1 mm. The projection amount of the projection 52 with respect to the metal tube 51 is desirably larger than the projection amount of the resin tube 11A with respect to the metal tube 12. Then, as shown in FIG. 6, at least part of the tip of the projection 52 of the formation tool 50 is inserted into the cavity of the resin tube 11A.

Figure 7:
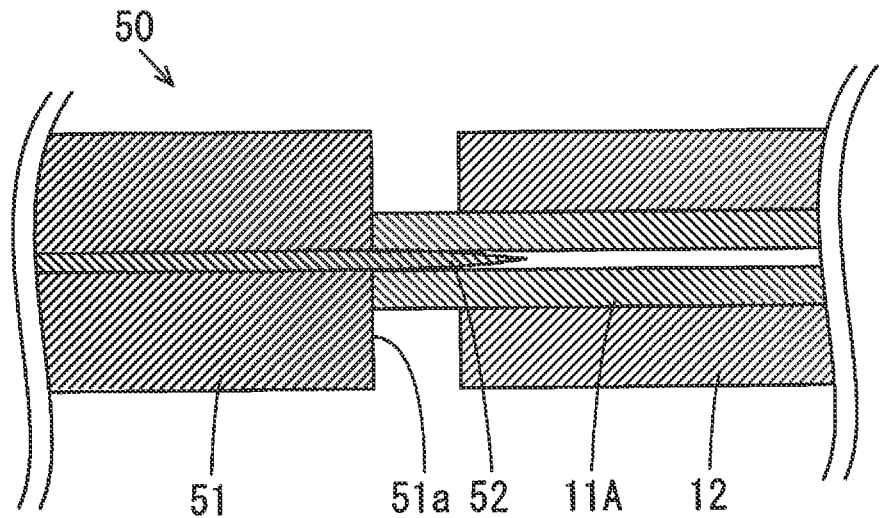
FIG. 7 is a cross sectional view for explaining the step of the resin-tube end formation method.
Figure 8:
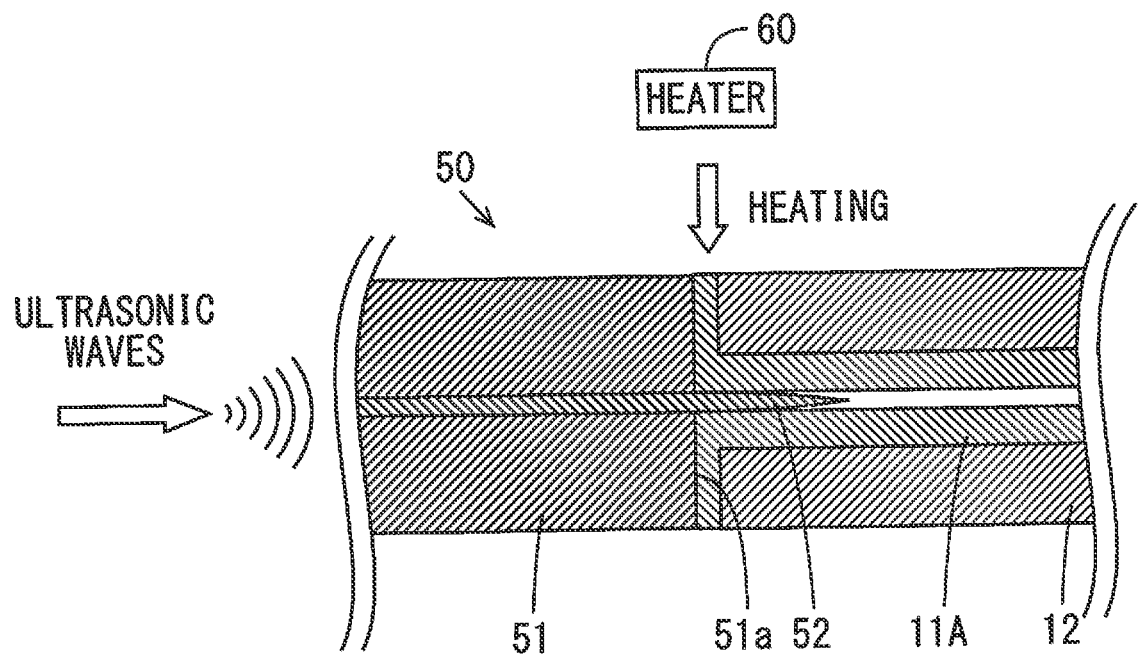
FIG. 8 is a cross sectional view for explaining the step of the resin-tube end formation method.

Thereafter, as shown in FIG. 7, the pressing surface 51a of the formation tool 50 is pressed against the end of the resin tube 11A. Further, as shown in FIG. 8, thermal energy is applied to the end of the resin tube 11A. The step of applying thermal energy in FIG. 8 may be performed after the step of pressing the pressing surface 51a against the end of the resin tube 11A in FIG. 7 or may be performed partially in parallel with the step in FIG. 7.

In the step of applying thermal energy in FIG. 8, the formation tool 50 may vibrate in the axial direction of the resin tube 11A by application of ultrasonic waves to the formation tool 50. Further, the frequency of ultrasonic waves is several tens of kilohertz, for example, and the amplitude of vibration of the formation tool 50 may be not less than several micrometers and not more than several tens of micrometers, for example. In this case, frictional heat generated by contact of the pressing surface 51a of the formation tool 50 with the resin tube 11A is applied to the end of the resin tube 11A as thermal energy. Therefore, thermal energy can be easily applied to the end of the resin tube 11A without a heater.

The method of applying thermal energy to the end of the resin tube 11A is not limited to the above-mentioned example. Thermal energy may be applied to the end of the resin tube 11A by a heater 60. For example, thermal energy may be applied to the end of the resin tube 11A by heating of the resin tube 11A using a conductive heat member, a heat gun or a cartridge heater, for example. Alternatively, thermal energy may be applied to the end of the resin tube 11A by placement of the resin tube 11A on a hot plate or a furnace. In these cases, thermal energy can be applied efficiently to the end of the resin tube 11A. Further, thermal energy may be applied to the end of the resin tube 11A by the heater 60 while ultrasonic waves are applied to the formation tool 50.

Figure 9:
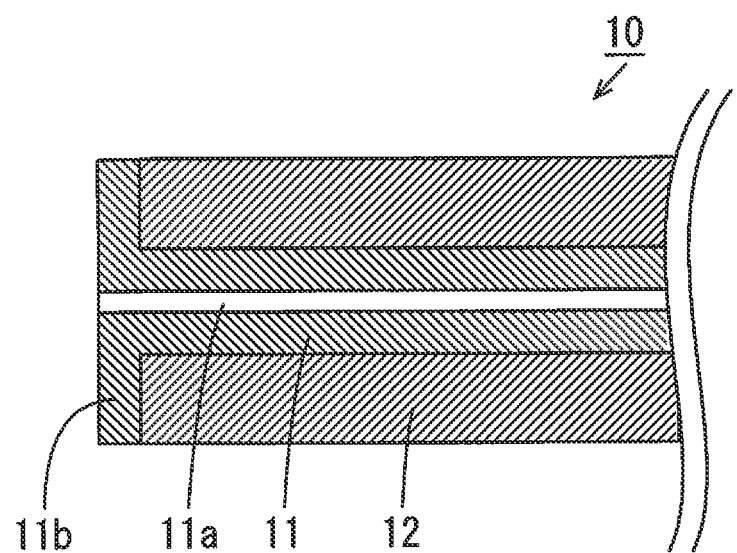
FIG. 9 is a cross sectional view for explaining the step of the resin-tube end formation method.

Thermal energy is applied to the end of the resin tube 11A, so that the temperature of the end of the resin tube 11A is increased. When the temperature of the end of the resin tube 11A exceeds a glass transition point, fluidity of resin is increased. Therefore, the component of resin flows between the pressing surface 51a of the formation tool 50 and the tip surface of the metal tube 12, and the shape of the pressing surface 51a of the formation tool 50 is transferred to the end of the resin tube 11A. Thus, as shown in FIG. 9, the resin tube 11 in which the flange 11b having a uniform thickness is formed at the end without closure of the cavity 11a is completed.

(5) Reference Example

Figure 10:
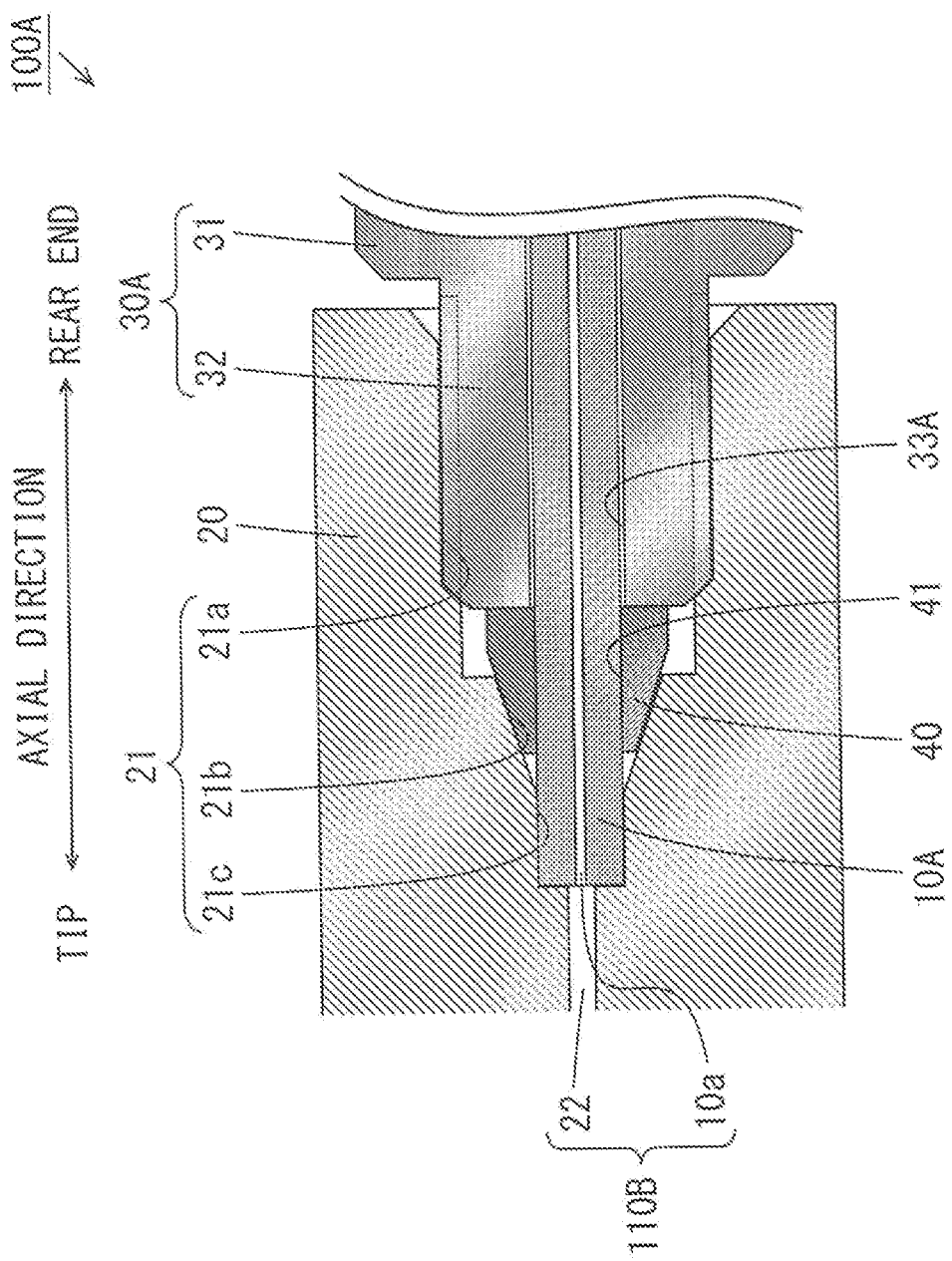
FIG. 10 is a cross sectional view showing the configuration of a fitting in a reference example.

As for a fitting in a reference example, differences from the fitting 100 of FIG. 2 will be described. FIG. 10 is a cross sectional view showing the configuration of the fitting in the reference example. As shown in FIG. 10, the fitting 100A in the reference example further includes a ferrule 40. Further, the fitting 100A includes a tube 10A instead of the tubing 10 and includes a male nut 30A instead of the male nut 30.

The tube 10A is formed of metal or resin and has a cavity 10a that penetrates in an axial direction. A flange is not formed at the tip of the tube 10A. The male nut 30A has the configuration similar to that of the male nut 30 of FIG. 2 except for having a through hole 33A extending in the axial direction instead of the opening 33 and the through hole 34. The tip of the ferrule 40 is formed to have a truncated cone shape corresponding to a tapered portion 21b of an opening 21 of a bushing 20. Further, a through hole 41 extending in the axial direction is formed in the ferrule 40.

The rear end of the tube 10A is inserted into the through hole 41 of the ferrule 40 and the through hole 33A of the male nut 30A in this order. The tip of the tube 10A projects from the ferrule 40 to the tip. In this state, a shaft portion 32 of the male nut 30A is fitted into the opening 21 of the bushing 20, and a head portion 31 is fastened by a fastening tool such that the male nut 30A rotates. Thus, a screw portion of the male nut 30A and a screw portion of the bushing 20 are threadly engaged with each other, and the fitting 100A is completed.

In the fitting 100A, a cavity 10a of the tube 10A and a through hole 22 of the bushing 20 communicate with each other, so that a flow path 1106 is constituted. Here, the tip surface of the male nut 30A presses the rear end surface of the ferrule 40, whereby the tip of the ferrule 40 is pressed against the tapered portion 21b of the bushing 20. In this case, the tip of the ferrule 40 and the tapered portion 21b of the bushing 20 adhere to each other. Further, the ferrule 40 is deformed, so that the inner peripheral surface of the ferrule 40 and the outer peripheral surface of the tube 10A adhere to each other. Thus, the gap between the tapered portion 21b and a large diameter portion 21a of the opening 21 is sealed.

However, in the fitting 100A, the fluid flowing in from the through hole 22 flows to a small diameter portion 21c of the opening 21 of the bushing 20 and infiltrates into the tapered portion 21b. Such a volume of the region into which fluid can infiltrate in the opening 21 is referred to as an unswept volume. In a case where the unswept volume of the fitting 100A is large, when a sample passes through the flow path 110b, the sample adheres to the outer peripheral surface of the tube 10A and is likely to remain. In this case, an undesirable phenomenon such as a reduction in separation of components included in the sample or detection of the sample used in this analysis in a next analysis may occur.

(6) Effects

With the method of forming the end of the resin tube 11A according to the present embodiment, the resin tube 11A is prepared. Further, the formation tool 50 having the pressing surface 51a and the projection 52 projecting from the pressing surface 51a and being insertable into the resin tube 11A is prepared. The projection 52 of the formation tool 50 is inserted into the resin tube 11A from the end of the resin tube 11A. The pressing surface 51a of the formation tool 50 is pressed against the end surface of the resin tube 11A. Thermal energy is applied to the end of the resin tube 11A, whereby the shape of the pressing surface 51a of the formation tool 50 is transferred to the end surface of the resin tube 11A, and the end of the resin tube 11A is formed in a flange shape.

With this method, in a case where the inner diameter of the resin tube 11A is small, specifically not more than 0.3 mm or not more than 0.1 mm, the cavity is prevented from being closed in the process of formation of the resin tube 11A. Further, even in a case where the resin tube 11A is formed of resin, such as PEEK, having a relatively high glass-transition temperature, the end of the resin tube 11A can be easily formed. Thus, the flange 11b can be easily formed at the end of the resin tube 11A.

In particular, it is possible to improve solvent resistance of the resin tube 11 and improve mechanical strength while reducing adsorptivity by using the resin tube 11A formed of PEEK. Therefore, the resin tube 11 formed of PEEK can be suitably used in the chromatograph 200 that sends liquid at a high pressure.

Further, the resin tube 11A is inserted into the metal tube 12, and the end of the resin tube 11A is held between the pressing surface 51a of the formation tool 50 and the end surface of the metal tube 12, whereby the end of the resin tube 11A is formed into a flange shape. Therefore, the flange can be more easily formed at the end of the resin tube 11A using the formation tool 50 and the metal tube 12. Further, the resin tube 11A can be mechanically reinforced by the metal tube 12.

Meanwhile, in the tubing 10, the resin tube 11 comes into contact with the sample, and the metal tube 12 does not come into contact with the sample. Therefore, even in a case where the sample includes a compound such as protein, peptide, nucleic acid or a specific type of pesticide, these compounds are hardly adsorbed onto the resin tube 11. Further, in the fitting 100, the unswept volume is reduced, so that adsorption of the sample onto the tubing 10 is suppressed. Therefore, a reduction in accuracy of analysis of the sample can be prevented.

(7) Other Embodiments (a) While the pressing surface 51a of the formation tool 50 is flat in the above-mentioned embodiment, the embodiment is not limited to this. The pressing surface 51a may be in any shape. For example, the pressing surface 51a may have an annular groove formed to surround the projection 52. In this case, the flange 11b having a projection corresponding to the groove is to be formed at the resin tube 11.

Such a projection surrounds the cavity 11a of the resin tube 11 and projects from the tip surface of the flange 11b to the tip. Thus, in the fitting 100, the projection of the flange 11b is firmly pressed against the bottom surface of the small diameter portion 21c of the opening 21 of the bushing 20. Thus, sealability between the through hole 22 and the opening 21 can be more sufficiently improved.

(b) While the resin tube 11 is inserted into the metal tube 12 in the above-mentioned embodiment, the embodiment is not limited to this. Even in a case where the resin tube 11 is not inserted into the metal tube 12, the flange 11b can be formed at the end of the resin tube 11 with the above-mentioned method. Therefore, in a case where the resin tube 11 has sufficiently high mechanical strength, the resin tube 11 does not have to be inserted into the metal tube 12.

(8) Aspects

It is understood by those skilled in the art that the plurality of above-mentioned illustrative embodiments are specific examples of the below-mentioned aspects.

(Item 1)

A resin-tube end formation method according to one aspect may include:

preparing a resin tube;

preparing a formation tool having a pressing surface and a projection that projects from the pressing surface and is insertable into the resin tube;

inserting the projection of the formation tool from an end of the resin tube into the resin tube;

pressing the pressing surface of the formation tool against an end surface of the resin tube; and transferring a shape of the pressing surface of the formation tool to the end surface of the resin tube and forming the end of the resin tube into a flange shape by applying thermal energy to the end of the resin tube.

With this resin-tube end formation method, the resin tube is prepared. Further, the formation tool having the pressing surface and the projection that projects from the pressing surface and is insertable into the resin tube is prepared. The projection of the formation tool is inserted from the end of the resin tube into the resin tube. The pressing surface of the formation tool is pressed against the end surface of the resin tube. Thermal energy is applied to the end of the resin tube, whereby the shape of the pressing surface of the formation tool is transferred to the end surface of the resin tube, and the end of the resin tube is formed in the flange shape.

With this method, even in a case where the inner diameter of the resin tube is small, the cavity is prevented from being closed in the process of formation of the resin tube. Further, even in a case where the resin tube is formed of resin having a high glass-transition temperature, the end of the resin tube can be easily formed. Thus, the flange can be easily formed at the end of the resin tube.

(Item 2)

In the resin-tube end formation method according to item 1, the resin tube may have an inner diameter of not more than 0.3 mm.

With this configuration, even in a case where the inner diameter of the resin tube is not more than 0.3 mm, the flange can be easily formed at the end of the resin tube without closure of the cavity.

(Item 3)

In the resin-tube end formation method according to item 2, the projection of the formation tool may have an outer diameter of not more than 0.3 mm.

With this configuration, even in a case where the inner diameter of the resin tube is not more than 0.3 mm, the flange can be more easily formed at the end of the resin tube without closure of the cavity.

(Item 4)

In the resin-tube end formation method according to item 1, the resin tube may have an inner diameter of not more than 0.1 mm.

With this configuration, even in a case where the inner diameter of the resin tube is not more than 0.1 mm, the flange can be easily formed at the end of the resin tube without closure of the cavity.

(Item 5)

In the resin-tube end formation method according to item 4, the projection of the formation tool may have an outer diameter of not more than 0.1 mm.

With this configuration, even in a case where the inner diameter of the resin tube is not more than 0.1 mm, the flange can be easily formed at the end of the resin tube without closure of the cavity.

(Item 6)

In the resin-tube end formation method according to any one of items 1 to 5, the preparing a formation tool may include:

preparing a first metal tube having an end surface as the pressing surface;

preparing a metal needle or a metal wire as a metal member; and inserting the metal member into and fixing the metal member to the first metal tube such that the metal member projects from the first metal tube as the projection.

In this case, the formation tool for forming the flange at the end of the resin tube can be easily prepared.

(Item 7)

In the resin-tube end formation method according to any one of items 1 to 6, the applying thermal energy to the end of the resin tube may include vibrating the formation tool by ultrasonic waves.

In this case, thermal energy can be easily applied to the end of the resin tube without a heater.

(Item 8)

In the resin-tube end formation method according to any one of items 1 to 7, the applying thermal energy to the end of the resin tube may include heating the end of the resin tube by a heater.

In this case, thermal energy can be efficiently applied to the end of the resin tube by the heater.

(Item 9)

In the resin-tube end formation method according to any one of items 1 to 9, the preparing a resin tube may include preparing the resin tube being inserted into a second metal tube, and the forming the end of the resin tube into a flange shape may include forming the end of the resin tube into the flange shape by holding the end of the resin tube between the pressing surface of the formation tool and an end surface of the second metal tube.

In this case, the flange can be more easily formed at the end of the resin tube using the formation tool and the second metal tube. Further, the resin tube can be mechanically reinforced by the second metal tube.

(Item 10)

A formation tool for forming an end of a resin tube according to another item may include:

a metal tube having an end surface as a pressing surface for pressing an end surface of the resin tube; and a metal member that is inserted into the metal tube and is made of a metal needle or a metal wire, wherein a projection that is insertable into the resin tube by projecting from the pressing surface of the metal tube may be formed at a tip of the metal member.

In this formation tool, the metal member made of a metal needle or a metal wire is inserted into the metal tube having an end surface as the pressing surface for pressing the end surface of the resin tube. The tip of the metal member projects from the pressing surface of the metal tube. The projection is inserted into the resin tube, and the pressing surface presses the end surface of the resin tube. Thus, the flange can be easily formed at the end of the resin tube.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A resin-tube end formation method including:
preparing a resin tube having a cavity;
preparing a formation tool having a pressing surface and a projection that projects from the pressing surface and is insertable into the cavity of the resin tube,
the projection being a metal needle or a metal wire having an outer diameter corresponding to an inner diameter of the resin tube;
inserting the projection of the formation tool from an end of the resin tube into the cavity of the resin tube;
pressing the pressing surface of the formation tool against an end surface of the resin tube; and
transferring a shape of the pressing surface of the formation tool to the end surface of the resin tube by applying thermal energy to the end of the resin tube to form the end of the resin tube into a flange shape without closure of the cavity of the resin tube by the metal needle or the metal wire.

2. The resin-tube end formation method according to claim 1, wherein the resin tube has an inner diameter of not more than 0.3 mm.

3. The resin-tube end formation method according to claim 2, wherein the projection of the formation tool has an outer diameter of not more than 0.3 mm.

4. The resin-tube end formation method according to claim 1, wherein the resin tube has an inner diameter of not more than 0.1 mm.

5. The resin-tube end formation method according to claim 4, wherein the projection of the formation tool has an outer diameter of not more than 0.1 mm.

6. The resin-tube end formation method according to claim 1, wherein
the preparing a formation tool includes
preparing a second metal tube having an end surface as the pressing surface;
preparing a metal needle or a metal wire as a metal member; and
inserting the metal member into and fixing the metal member to the second metal tube such that the metal member projects from the second metal tube as the projection.

7. The resin-tube end formation method according to claim 1, wherein
the applying thermal energy to the end of the resin tube includes vibrating the formation tool by ultrasonic waves.

8. The resin-tube end formation method according to claim 1, wherein
the applying thermal energy to the end of the resin tube includes heating the end of the resin tube by a heater.

9. The resin-tube end formation method according to claim 1, wherein
the preparing a resin tube includes preparing the resin tube being inserted into the first metal tube; and
the forming the end of the resin tube into a flange shape includes forming the end of the resin tube into the flange shape by holding the end of the resin tube between the pressing surface of the formation tool and an end surface of the first metal tube.

10. A formation tool for forming an end of a resin tube having a cavity, comprising:
a metal tube having an end surface as a pressing surface for pressing an end surface of the resin tube; and
a metal member that is inserted into the metal tube and is made of a metal needle or a metal wire, wherein:
the metal member includes a projection projecting from the pressing surface of the metal tube that is insertable into the cavity of the resin tube;
a shape of the pressing surface is transferred to the end surface of the resin tube by applying thermal energy to the end of the resin tube to form the end of the resin tube into a flange shape without closure of the cavity of the resin tube by the projection.

11. A resin-tube end formation method including:
preparing a resin tube for a liquid chromatograph that has an inner diameter of not more than 0.3 mm;
preparing a formation tool having a pressing surface and a projection that projects from the pressing surface and is insertable into the resin tube, the projection having an outer diameter of not more than 0.3 mm;
inserting the projection of the formation tool from an end of the resin tube into the resin tube;
pressing the pressing surface of the formation tool against an end surface of the resin tube; and
transferring a shape of the pressing surface of the formation tool to the end surface of the resin tube by applying thermal energy to the end of the resin tube to form the end of the resin tube into a flange shape without closure of the cavity of the resin tube by the projection.

* * * * *